J. SPYKER.
ELASTIC ROAD WHEEL.
APPLICATION FILED AUG. 13, 1910.
1,075,168.
Patented Oct. 7, 1913.
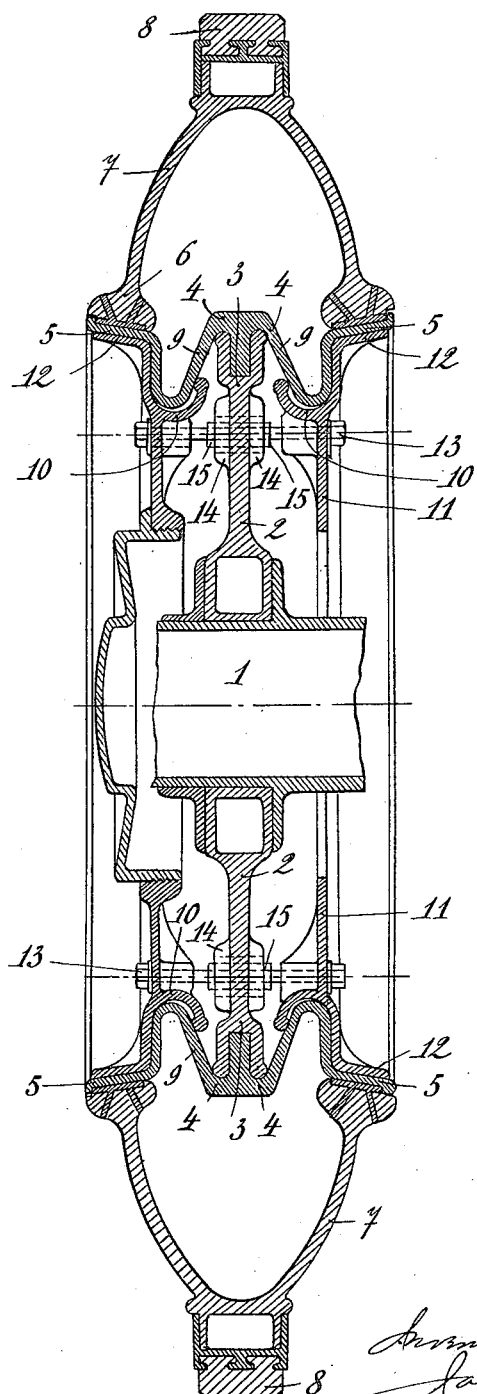

UNITED STATES PATENT OFFICE.

JACOBUS SPYKER, OF AMSTERDAM, NETHERLANDS.

ELASTIC ROAD-WHEEL.

1,075,168.　　　　　Specification of Letters Patent.　　Patented Oct. 7, 1913.

Application filed August 13, 1910.　Serial No. 576,945.

*To all whom it may concern:*

Be it known that I, JACOBUS SPYKER, a subject of the Queen of the Netherlands, and residing at 1ᵈ Sarphatistraat, Amsterdam, Netherlands, have invented certain new and useful Improvements in Elastic Road-Wheels, of which the following is a specification.

This invention consists in improvements in elastic road wheels, and particularly in certain features of construction, the advantages of which will appear more fully hereinafter.

The improvements forming the subject of the present invention comprise a grooved fixed support for the flexible support or band, which shuts off the rigid air-chamber or tire, and which supports the driving wheel, central guide or hub part. By the arrangement of this fixed support the supporting band can detach itself on one side from the support and follow the eccentric displacing movement of the inner wheel or central guide, but is obliged to rest on partitions and is limited in its movement by the same when the movement is in the opposite direction. The movement is not arrested and is limited only by the flexibility and elasticity of the supporting band when it takes place toward the "outside" *i. e.* toward the rim, while the displacement of the bands toward the inside or toward the center of the wheel is arrested or limited by the fixed partitions. In other words, during the eccentric displacement of the wheel or central guide owing to shocks, vibrations, etc., the band can freely follow this movement, at that part of the wheel which is situated near the ground at that movement while it is held back at the "upper" part of the wheel so that the eccentric displacement of the central guide produces on the one hand a diminution in the cross-section available for the compressed air (on account of the penetration into the exterior wheel) but cannot produce at the opposite side of the wheel (owing to the sinking of the central guide 3) a corresponding increase in the chamber of the rigid wheel which would compensate for the diminution in cross-section produced at the opposite side.

The eccentric displacements of the inner wheel produce, in a similar manner to pneumatic tires having flexible treads, a decrease in the capacity of the air chamber corresponding to the amplitude of the displacement of the axis, and thus create an increase of compression in the air chamber which produces a movement of reaction utilizing this increase of pressure. The elasticity of the wheel, combined also with the considerable volume of the air chamber, is thus particularly suitable for the absorption of shocks and vibrations.

The improvements further consist in the arrangement of an arresting partition or support for each wing of the flexible band, which also support the central disk in a flexible manner so as to form a movable joint for the central disk and thus allow a certain limit to the angular displacement of the latter with respect to the center plane of the outer wheel.

The present improvements comprise a special arrangement of the flexible supporting band and a method of its attachment to the outer rigid wheel and engagement with the inner wheel.

The accompanying drawing represents in section by way of example one construction of the improved wheel.

1 is the hub on which is mounted the inner wheel or central guide 2 formed in its periphery with a recess 3 for the central web of a flexible band 4 whose lateral ends 5, 5 are attached hermetically to the ends 6 of a rigid casing 7 forming the outer running wheel which may be provided with a tread 8. The flexible band 4 is made in one piece and forms two pockets 9, 9 facing the center of the wheel.

The supporting partitions 10 are situated at the exterior of the pockets 9 and limit their movement toward the center or interior of the wheel while allowing the pockets of the band to be displaced toward the periphery of the wheel. The partitions 10 have a concave shape so as to accommodate the pockets of the band and are formed in one piece with disks 11, 11 terminating laterally in flanges 12, 12 for fixing the edges 5 of the band on the rigid casing 6, 7. The partitions stop short a certain distance from the periphery of the inner wheel 2 so as to allow the two parts 7, 8 and 2 to be displaced relatively to each other. The inner disk 2 has its movements confined in this manner so as to be able to perform its eccentric displacements and so that it allows relative angular displacement of the two parts 2 and 7 of the wheel to take place. The disks 11 of the partitions 10 are connected together by bolts and nuts 13. The bolts pass through sleeves or bosses 14 formed on the disk 2 fixed to the hub 1 and have sufficient play in the said bosses for their eccentric displacement and so as to allow the bolts and therefore the exterior wheel to take up oblique positions to the desired extent. In order to diminish the extent of the movements by means of the guiding members, a rubber sleeve 15 is slipped over the bolt 13.

When the wheel is in operation, the load, etc., produces an eccentric displacement of the central guide 2 which, being covered by the band 4, penetrates the interior of the wheel 7 (at the part close to the ground) and compresses the air contained therein by means of the whole surface of the penetrating part. At the opposite side (the upper part of the wheel) the partitions 10, 10 prevent the band 4 from being forced away, and allow it at most to fold back to a small extent. The cross section of the outer wheel 7 therefore is not at all, or only slightly modified at the upper part while it is diminished at the lower part of the wheel which produces an increase in the compression corresponding to the amplitude of the eccentric movement of the member 1. When the inequalities of the road require it, the wheel 7 owing to the movable connection between 10 and 3 and the sleeve 14, is slightly displaced with respect to the central plane of the member 2, while insuring the eccentric displacements, this motion being also aided by the concave supporting partitions.

Having now described my invention what I claim as new and desire to secure by Letters Patent is:—

1. An elastic road wheel comprising in combination, a hollow outer wheel chamber containing compressed air, an inner wheel, a flexible band between and connected with the two wheels, and fixed supporting partitions on the outer wheel engaging with the flexible band whereby the inwardly directed displacements are limited but not the outwardly directed displacements.

2. An elastic road wheel comprising in combination, a hollow outer wheel compressed air chamber, an inner wheel, a flexible band containing inwardly directed pockets and connecting the two wheels, and fixed recessed partitions on the outer wheel to engage with the pocketed flexible band for the purpose described.

3. An elastic road wheel comprising in combination, a hollow outer wheel compressed air chamber, an inner wheel, a pocketed band connecting the two wheels adapted to flex at the center portion, and fixed recessed partitions on the outer wheel for the purpose described.

4. An elastic road wheel comprising in combination, a hollow outer wheel compressed air chamber, an inner wheel, a flexible pocketed band connecting the two wheels, fixed recessed partitions on the outer wheel engaging the band, and means for connecting the partitions together.

5. An elastic road wheel comprising in combination, a hollow outer wheel compressed air chamber, an inner wheel, a flexible pocketed band connecting the two wheels, fixed recessed partitions on the outer wheel engaging the band, means for connecting the partitions together, the outer edges of the partitions serving to connect the outer edges of the band to the outer wheel.

6. An elastic road wheel comprising in combination, a hollow outer wheel compressed air chamber, an inner wheel disk, having a grooved periphery, a flexible pocketed centrally ribbed band, the lateral edges of which are connected with the outer wheel and the central rib engages the grooved periphery of the inner wheel disk, and recessed partitions connected to the outer wheel.

7. An elastic road wheel comprising in combination, a hollow outer wheel chamber containing compressed air, an inner wheel disk having a grooved periphery, a centrally ribbed flexible pocketed band connecting the outer wheel chamber and the inner wheel disk, recessed partitions on the outer wheel and engaging the flexible band, and means for connecting the partitions together.

In testimony whereof I have signed my name to this specification in the presence of two subscribing witnesses.

JACOBUS SPYKER.

Witnesses:
 ARMAND VEACHY,
 A. J. JOHNSON.

Copies of this patent may be obtained for five cents each, by addressing the "Commissioner of Patents, Washington, D. C."